United States Patent
Miura et al.

(10) Patent No.: US 9,094,553 B2
(45) Date of Patent: Jul. 28, 2015

(54) SHEET CONVEYER AND IMAGE READER

(71) Applicants: Katsuro Miura, Toyota (JP); Tsuyoshi Suganuma, Nagoya (JP)

(72) Inventors: Katsuro Miura, Toyota (JP); Tsuyoshi Suganuma, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/935,606

(22) Filed: Jul. 5, 2013

(65) Prior Publication Data

US 2014/0009803 A1    Jan. 9, 2014

(30) Foreign Application Priority Data

Jul. 6, 2012 (JP) ................................ 2012-152943

(51) Int. Cl.
- *H04N 1/04* (2006.01)
- *H04N 1/00* (2006.01)
- *H04N 1/12* (2006.01)
- *H04N 1/193* (2006.01)

(52) U.S. Cl.
CPC ....... *H04N 1/00615* (2013.01); *H04N 1/00591* (2013.01); *H04N 1/00618* (2013.01); *H04N 1/12* (2013.01); *H04N 1/193* (2013.01); *H04N 2201/0081* (2013.01)

(58) Field of Classification Search
CPC .......... H04N 1/00515; H04N 1/00591; H04N 1/00618; H04N 1/12; H04N 1/193; H04N 2201/0081
USPC ................................. 358/498, 474, 497, 496
See application file for complete search history.

(56) References Cited

U.S. PATENT DOCUMENTS

| 4,540,166 | A | * | 9/1985 | Massengeil et al. | ......... 271/3.01 |
| 7,604,228 | B2 | | 10/2009 | Ohama et al. | |
| 2005/0212195 | A1 | | 9/2005 | Ohama et al. | |

FOREIGN PATENT DOCUMENTS

| JP | 2005-096877 A | 4/2005 |
| JP | 2005-247575 A | 9/2005 |
| JP | 2008-050154 A | 3/2008 |

* cited by examiner

*Primary Examiner* — Houshang Safaipour
(74) *Attorney, Agent, or Firm* — Banner & Witcoff, Ltd.

(57) ABSTRACT

A sheet conveyer includes: a conveyance unit configured to convey a sheet along a conveyance path comprising an inversion path, which is configured to convey the sheet from a lower side to an upper side and is defined by an inner circumference side and an outer circumference side; and a guide provided in a downstream side in a conveyance direction of the inversion path, the guide provided between the inner circumference side and the outer circumference side so that the guide is to be displaced toward the outer circumference side by contacting with a front end of the sheet that is conveyed from an upstream side in the conveyance direction.

11 Claims, 7 Drawing Sheets

FIG.1
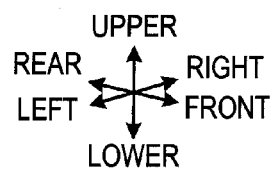
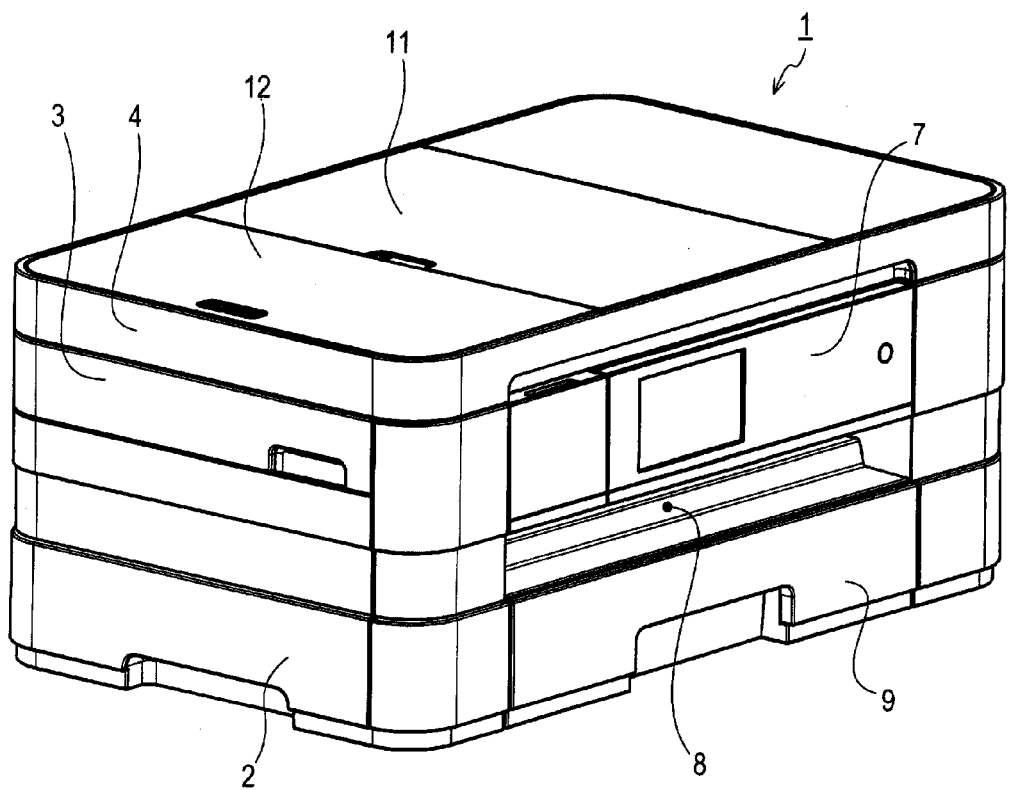

SHEET CONVEYER AND IMAGE READER

CROSS-REFERENCE TO RELATED APPLICATION

This application claims priority from Japanese Patent Application No. 2012-152943 filed on Jul. 6, 2012, the entire subject matter of which is incorporated herein by reference.

TECHNICAL FIELD

This disclosure relates to a sheet conveyer and an image reader.

BACKGROUND

As a sheet conveyer provided in an image reader, there is a sheet conveyer, which conveys a sheet that is conveyed along a lower path toward an upper path provided on an upper side of the lower path through conveying the sheet upward along an inversion path (e.g., see JP-A-2005-247575).

SUMMARY

However, in the sheet conveyer described in JP-A-2005-247575, the front end of the sheet is in a state where it is conveyed upward against gravity in the inversion path. Accordingly, the conveyance of the sheet is easy to be obstructed in the inversion path, as compared with a case where the front end of the sheet is conveyed downward along the gravity.

According to the circumstances, if a radius of curvature is lowered in the inversion path in order to seek miniaturization and thin-filming of the device, the front end of the sheet is strongly pushed to a guide surface, and thus the traveling direction of the sheet is suddenly changed. Accordingly, the conveyance of the sheet is still more easily obstructed, and for example, if the front end of the sheet, which is conveyed upwardly along the inversion path, is bumped against the guide surface, the conveyance speed of the sheet may become unstable, such as instantaneous reduction of the speed of the sheet.

If the conveyance speed of the sheet becomes unstable as described above, it is unable to smoothly convey the sheet to the downstream side in the conveyance direction. As a result, the conveyance state becomes unstable even at a point where the sheet passes through a reading unit, and this may cause the quality of an image that is read by the reading unit to deteriorate.

Accordingly, this disclosure provide at least a sheet conveyer, which can stabilize the conveyance speed of a sheet although the device has a structure that conveys the sheet upward in an inversion path, and an image reader, which is provided with a configuration that corresponds to such a sheet conveyer.

In view of the above, a sheet conveyer of this disclosure includes: a conveyance unit and a flexible guide. The conveyance unit is configured to convey a sheet along a conveyance path comprising an inversion path, which is configured to convey the sheet from a lower side to an upper side and is defined by an inner circumference side and an outer circumference side. The guide is provided in a downstream side in a conveyance direction of the inversion path, and the guide is provided between the inner circumference side and the outer circumference side so that the guide is to be displaced toward the outer circumference side by contacting with a front end of the sheet that is conveyed from an upstream side in the conveyance direction.

Meanwhile, a sheet conveyer in another aspect, includes: a conveyance unit and a guide. The conveyance unit is configured to convey a sheet along a conveyance path, which includes a lower path, a upper path positioned on an upper side of the lower path, and an inversion path connecting the lower path and the upper path to each other to convey the sheet, from a lower side to an upper side, from the lower path to the upper path. The flexible guide is provided in a position close to the upper path in the inversion path to guide a front end of the sheet to a downstream side in a conveyance direction with being elastically deformed according to a force applied from the sheet when the front end of the sheet, which is conveyed from an upstream side in the conveyance direction, comes in contact with the flexible guide.

In this sheet conveyer, since the front end of the sheet is in a state where it is conveyed upward against gravity in the inversion path, the conveyance of the sheet is easy to be obstructed in the inversion path, unlike a case where the front end of the sheet is conveyed downward along the gravity.

However, the flexible guide as described above is provided in the position close to the upper-side path in the inversion path. Thus, when the front end of the sheet comes in contact with the flexible guide, the flexible guide is elastically deformed, so that the portion, which becomes the guide surface of the sheet in the flexible guide, retreats to the outer circumference side.

Accordingly, unlike the case where the front end of the sheet that is being conveyed comes in contact with the guide surface that is fixed to the fixed position, the sheet can be suppressed from slowing instantaneously due to the elastic deformation of the flexible guide when the front end of the sheet, which is conveyed upward, comes in contact with the guide surface. Accordingly, the conveyance speed of the sheet, which is conveyed upward in the inversion path, can be stabilized, and thus the sheet can be conveyed to the downstream side in the conveyance direction more smoothly.

Further, an image reader of this disclosure includes a conveyance unit, a reading unit and a guide. The conveyance unit is configured to convey a sheet along a conveyance path comprising an inversion path, which is configured to convey the sheet from a lower side to an upper side and is defined by an inner circumference side and an outer circumference side. The reading unit is configured to read an image of the sheet that is conveyed by the conveyance unit. The guide is provided in a downstream side in a conveyance direction of the inversion path, and the guide is provided between the inner circumference side and the outer circumference side so that the guide is to be displaced toward the outer circumference side by contacting with a front end of the sheet that is conveyed from an upstream side in the conveyance direction.

BRIEF DESCRIPTION OF THE DRAWINGS

The foregoing and additional features and characteristics of this disclosure will become more apparent from the following detailed descriptions considered with the reference to the accompanying drawings, wherein:

FIG. 1 is a perspective view illustrating a multifunction peripheral as an example of the present invention;

DETAILED DESCRIPTION

Figure 2:
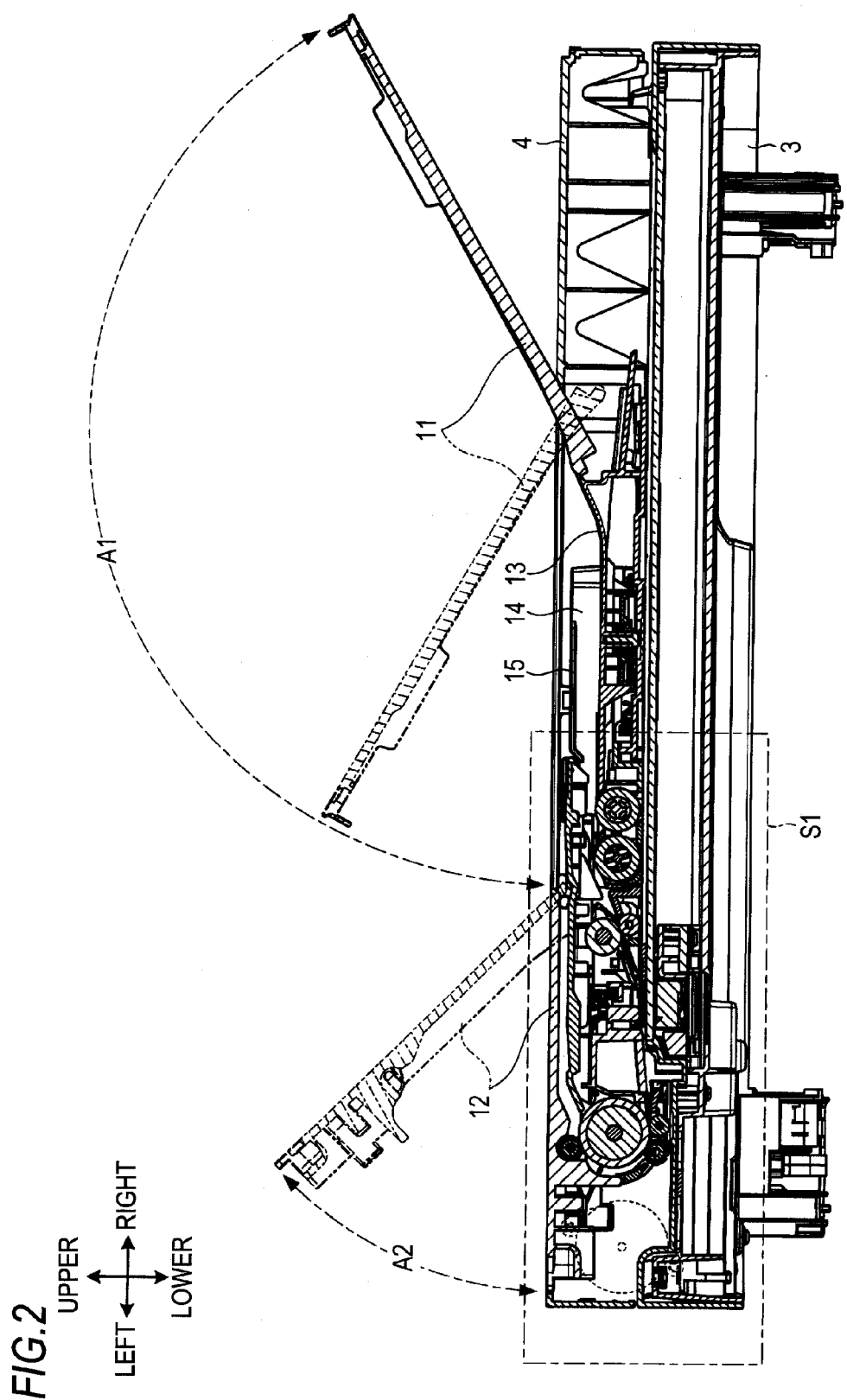
FIG. 2 is a longitudinal cross-sectional view illustrating the inner structure of a document conveyance unit and a reading unit.

Hereinafter, embodiments of this disclosure will be described. In this embodiment, an exemplified sheet conveyer is configured as an automatic document conveyance device that is provided in an image reader. Further, the image reader that is exemplified in this embodiment s configured as a multifunction peripheral having other functions (e.g., print function, copy function, facsimile transmission/reception function, and the like) in addition to the function (scan function) as the image reader.

In the following description, for simple explanation of relative positional relations between respective portions of the multifunction peripheral, respective directions, that is, upper, lower, left, right, front, and rear directions, as described in the drawings will be used.

[Structure of a Multifunction Peripheral]

As illustrated in FIG. 1, a multifunction peripheral 1 includes a main body unit 2, a reading unit 3 mounted on an upper side of the main body unit 2, and a document conveyance unit 4 (corresponding to an example of a sheet conveyer according to the present invention) mounted on an upper side of the reading unit 3.

In the main body unit 2, an image forming portion, a control portion, and a power supply portion are built, and various kinds of mechanisms, which are installed in the main body unit 2, the reading unit 3, and the document conveyance unit 4, are controlled by the control portion provided in the main body unit 2.

The reading unit 3 has a structure that is rotatable against the main body unit 2 about an axis that extends in the left and right directions in the vicinity of rear ends of the main body unit 2 and the reading unit 3 as the center of rotation. If the reading unit 3 is rotated and the front end side of the reading unit 3 is displaced upward, an opening of an upper surface of the main body unit 2 is opened, and thus maintenance work of the respective portions (the image forming portion, the control portion, and the power supply portion) built in the main body unit 2 can be performed.

The document conveyance unit 4 has a structure that is rotatable against the reading unit 3 about an axis that extends in the left and right directions in the vicinity of rear ends of the reading unit 3 and the document conveyance unit 4 as the center of rotation. In accompaniment of this rotation, the document conveyance unit 4 is displaced between a closed position and an open position.

If the document conveyance unit 4 is displaced to the open position, a document to be read, which is provided on the upper surface of the reading unit 3, is exposed. Further, if the document conveyance unit 4 is displaced to the closed position, the document conveyance unit 4 functions as a cover to cover the document.

An operation panel 7 that is operated by a user is provided on an upper side of the front surface of the main body unit 2. Further, an outlet 8 is formed on the lower side of the operation panel 7 in the main body unit 2, and a recorded medium, on which an image is formed, in the image forming portion provided in the main body unit 2 can be taken out from the outlet 8 after being discharged. On the lower side of the outlet 8, a sheet feeding cassette 9, in which the recorded medium before printing is accommodated, is mounted.

A first upper surface cover 11 and a second upper surface cover 12 are provided on the upper surface of the document conveyance unit 4. As indicated by arrows A1 and A2 in FIG. 2, the first upper surface cover 11 and the second upper surface cover 12 have structures that are rotatable against the document conveyance unit 4, about the axis that extends in the front and rear directions in the vicinity of right ends of the first and second upper surface covers 11 and 12 in a closed state, as the center of rotation.

When the first upper surface cover 11 is in the closed state, the portion of the first upper surface cover 11, which extends in the left direction from the vicinity of the center of rotation, covers a sheet passing surface 13 that is below the first upper surface cover 11. On the other hand, if the first upper surface cover 11 is rotated and displaced to the open position, the first upper surface cover 11 is in a state where it extends obliquely upward to the right from the center of rotation, and configures a document placement portion together with the sheet passing surface 13.

A pair of side guides 14 is provided on the sheet passing surface 13. Both the side guides 14 are slidable in the front and rear directions. Specifically, one of the side guides 14 slides in an opposite direction to the direction of the other of the side guides 14. Accordingly, in order to change the distance between the pair of side guides 14, they can slide to be close to each other or to be apart from each other only through operating one of them.

Further, a partition plate 15, which is formed by making a plate-shaped body substantially horizontally extend in the opposite direction from an upper end of the side guides 14, is provided in each side guide 14. The document that is the conveyance target passes through a lower side of the partition plate 15 and is set to an area that reaches the first upper surface cover 11 along the sheet passing surface 13. In this state, by making the side guides 14 come in contact with end faces that are parallel to the document conveyance direction, the document conveyance direction is restricted.

In the case where the document is conveyed along the conveyance path, the conveyed document is discharged upwardly of the partition plate 15, and then is sent out to the area measured from the sheet passing surface 13 to the first upper surface cover 11. That is, in the multifunction peripheral 1, the area measured from the first upper surface cover 11 to the sheet passing surface 13 is used as the placement portion on which the document is placed and also the discharge portion from which the document is discharged.

In the same manner as the first upper surface cover 11, when the second upper surface cover 12 is in a closed state, the portion of the second upper surface cover 12, which extends in the left direction from the vicinity of the center of rotation, covers the portion below the second upper surface cover 12. On the other hand, if the second upper surface cover 12 is rotated and displaced to the open position, the document conveyance path that is below the second upper surface cover 12 is exposed. In this state, works to remove the document that gets jammed on the lower side of the second upper surface cover 12 can be carried out.

[Details of the Reading Unit and the Document Conveyance Unit]

Next, the details of the reading unit 3 and the document conveyance unit 4 will be described.

Figure 3:
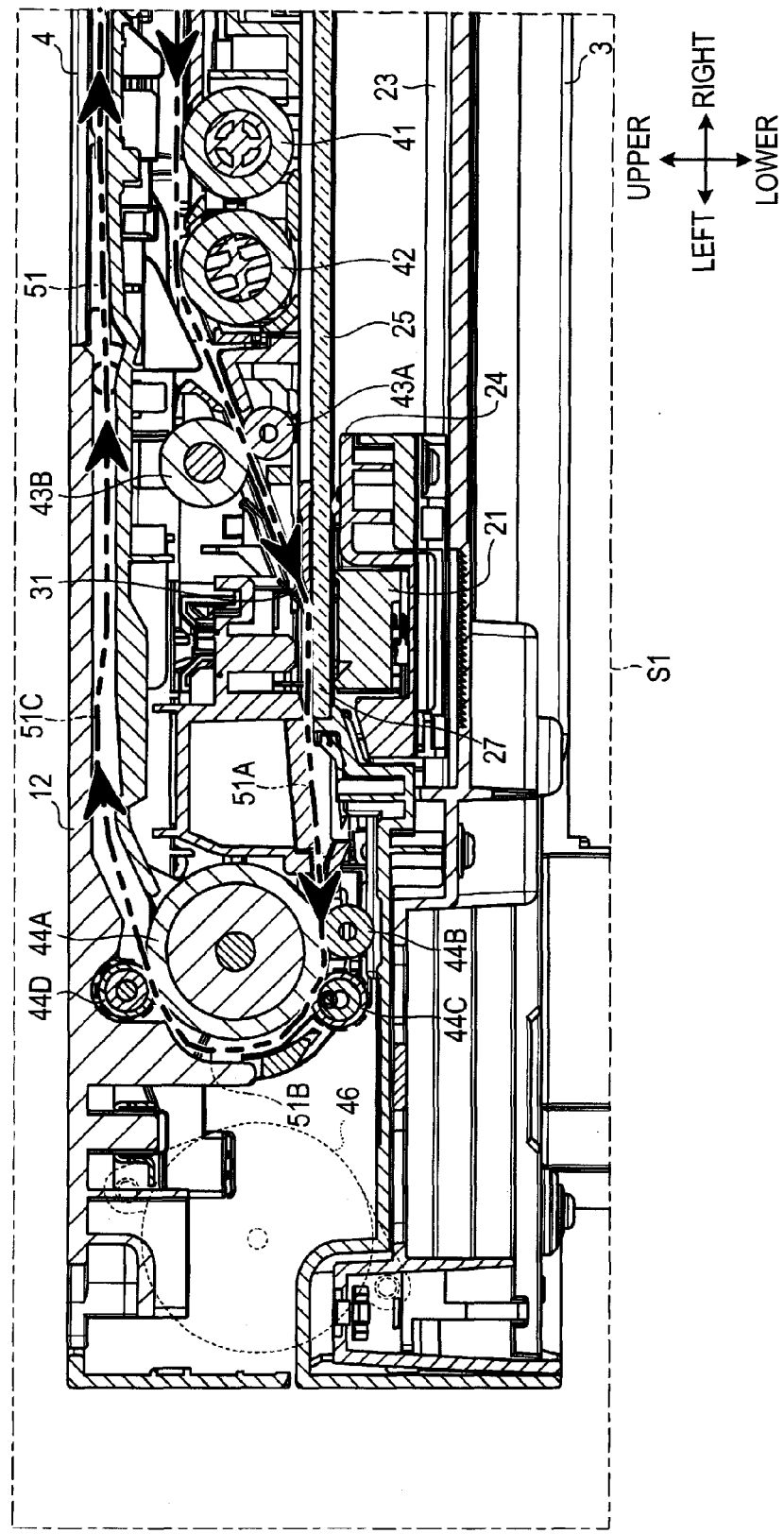
FIG. 3 is an enlarged longitudinal cross-sectional view illustrating an area S1 in FIG. 2.

As shown in FIG. 3, an image sensor 21 is provided in the reading unit 3. In this embodiment, a contact image sensor (CIS) is adopted as the image sensor 21.

The image sensor 21 is mounted on a carriage 24 that is movable along a guide rail 23 that extends in the left and right directions. The carriage 24 is connected to a timing belt (not illustrated) that is driven by a motor (not illustrated), and thus the image sensor 21 and the carriage 24 are structured to reciprocate in the left and right directions in the reading unit 3. In the case of reading the document in a so-called flatbed method, the image sensor 21 reads an image of the document as it reciprocates in the reading unit 3. In the case of reading the image of the document in an ADF (Auto Document Feeder) method, the image sensor 21 is stopped in a predetermined position to read the image of the document.

Further, at a position that becomes an upper part of a reciprocating movement path of the image sensor 21 on a side of the reading unit 3, a first transparent portion 25, which forms a document placement surface on which the document is placed when reading the document in the flatbed method, and a second transparent portion 27, through which the document passes when reading the document in the ADF method, are provided.

Both the first transparent portion 25 and the second transparent portion are positioned on the upper surface of the reading unit 3, and in this embodiment, the first transparent portion 25 and the second transparent portion 27 are configured by using a single glass plate. On the other hand, the first transparent portion 25 and the second transparent portion 27 may be configured by using different glass plates. Further, the first transparent portion 25 and the second transparent portion 27 may be made of a material except for glass as far as the material is transparent so that the image sensor 21 can read the document through the material.

Further, a document pressing portion 31 is provided at a position that becomes an upper part of the second transparent portion 27 on a side of the document conveyance unit 4. The document pressing portion 31 is urged downward by a compression spring (not illustrated), and thus the document pressing portion 31 slightly presses the upper surface side of the second transparent portion 27. Through pressing by the document pressing portion 31, the document, which is conveyed between the document pressing portion 31 and the second transparent portion 27, is properly pressed to the side of the second transparent portion 27, and thus the document can be conveyed while it is being contact with the second transparent portion 27.

Further, a supply roller 41, a separation roller 42, a pair of relay rollers 43A and 43B, conveyance rollers 44A, and pinch rollers 44B to 44D are provided in the document conveyance unit 4. Among them, some rollers are rotated by a motive power that is transmitted from a motor 46 through a gear mechanism (not illustrated). Further, the remaining rollers are rotated so as to be driven by the rotating rollers or the document that is conveyed by the rollers.

A member for providing a guide surface for guiding the document in a proper conveyance direction is arranged between the respective rollers, and a conveyance path 51, which is measured from a lower-side path 51A to an upper-side path 51C through an inversion path 51B, is configured by the roller group and the guide surface.

[Details of the Structure in the Vicinity of the Inversion Path]

Figure 4:
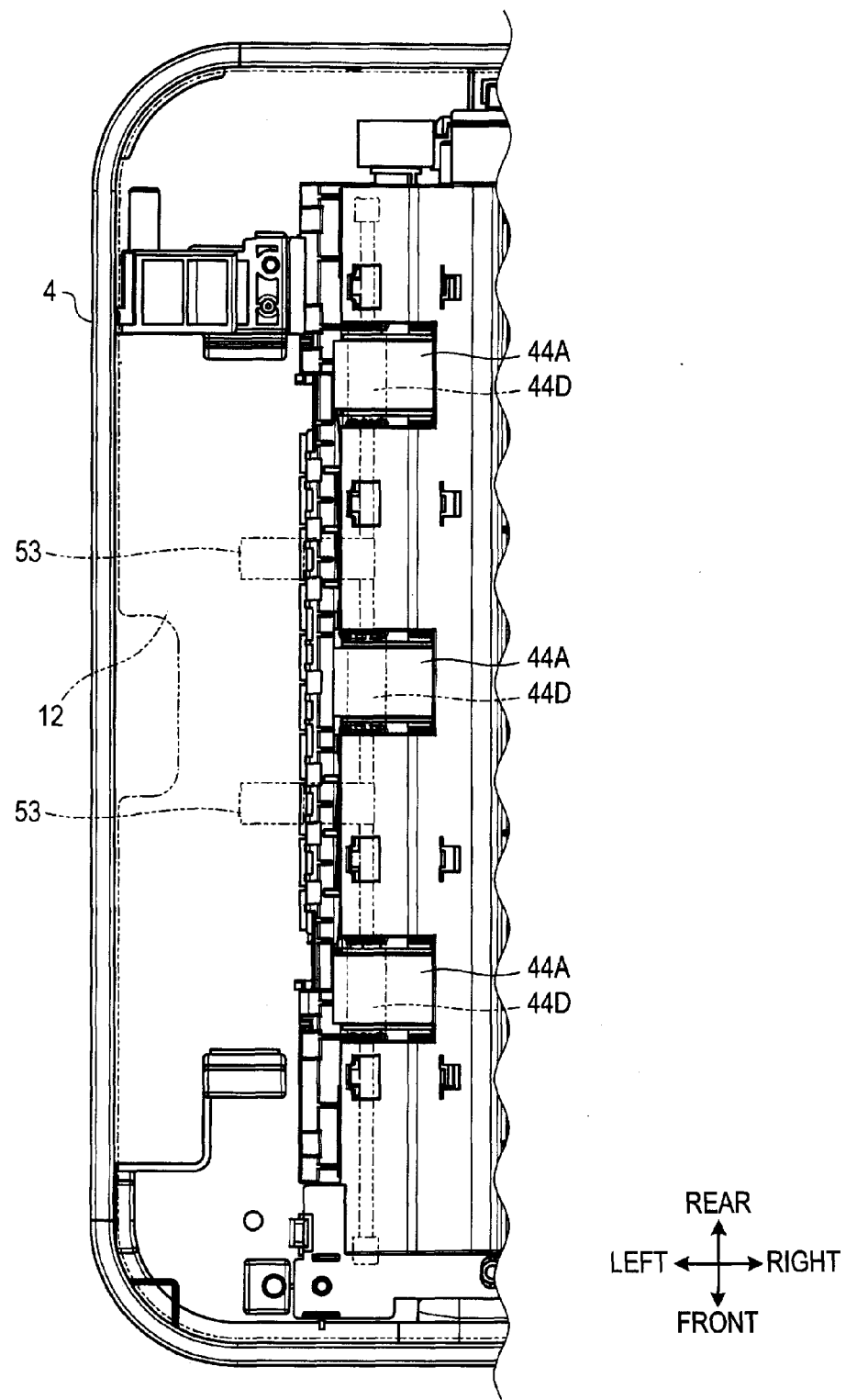
FIG. 4 is an explanatory view illustrating the structure in the vicinity of a conveyance roller.

As shown in FIG. 4, the plurality of conveyance rollers (in this embodiment, three conveyance rollers) 44A are arranged at intervals in a direction in which rotating shafts of the conveyance rollers 44A extend (in the front and rear directions in FIG. 4). The plurality of conveyance rollers 44A are integrally rotated in the same direction to function as a single roller.

Further, as shown by the two-dot chain line, the pinch rollers 44D are arranged in positions corresponding to the respective conveyance rollers 44A on the upper sides of the conveyance rollers 44A, and flexible guides (in this embodiment, two flexible guides) 53 are arranged in positions between the adjacent conveyance rollers 44A. The pinch rollers 441) and the flexible guides 53 are attached to the lower surface side of the second upper surface cover 12.

Figure 5:
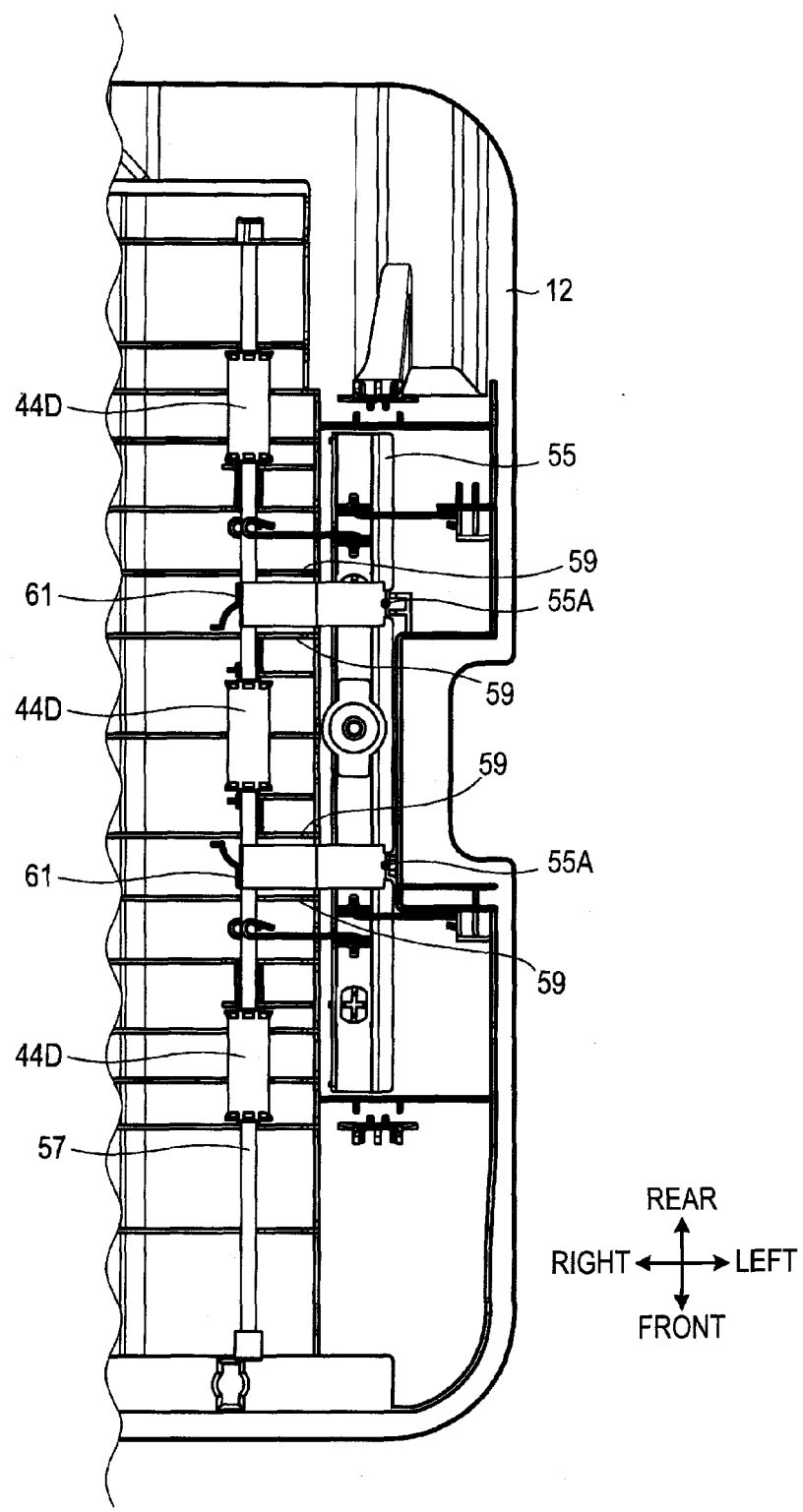
FIG. 5 is an explanatory view illustrating the structure in the vicinity of a pinch roller.
Figure 6:
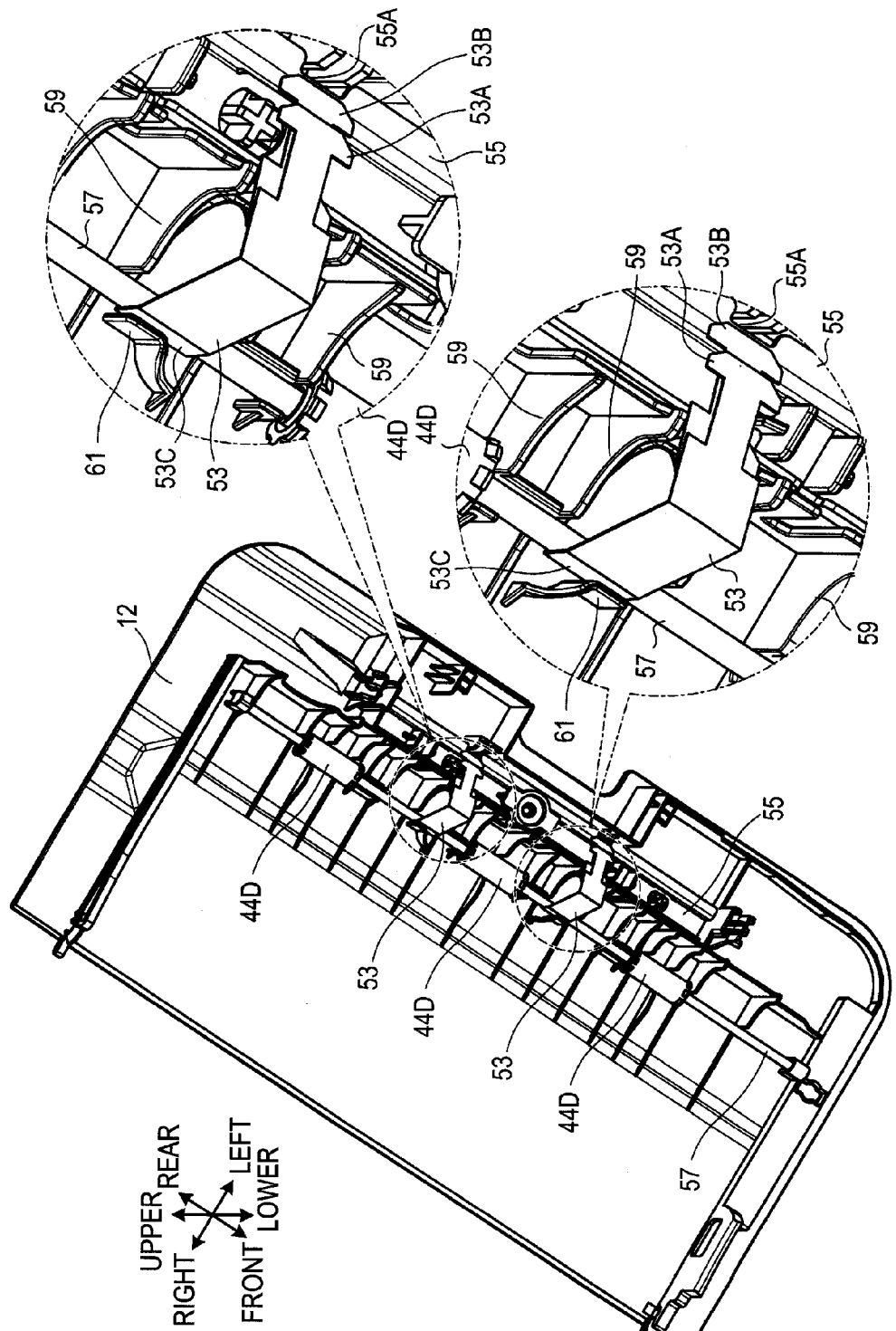
FIG. 6 is a perspective view illustrating an attachment structure of a flexible guide.

FIG. 5 is a view illustrating a state where the second upper surface cover 12, which is indicated by the two-dot chain line in FIG. 4, is reversed by rotation of 180 degrees about the axis that extends in the front and rear directions. FIG. 6 is a perspective view illustrating a state where the second upper surface cover 12 is seen diagonally from the diagonally right rear side. FIG. 6 shows the state just before the flexible guide 53 is attached to the second upper surface cover 12.

As shown in FIGS. 5 and 6, a metal reinforcement member 55, which extends in the front and rear directions from the left side of the pinch roller 44D. is attached on the lower surface of the second upper surface cover 12. This reinforcement member 55 has notch portions 55A formed at two points thereof, and the flexible guide 53 is inserted into a gap that is formed between the notch portions 55A and the second upper surface cover 12.

The flexible guide 53 is made of a film material of synthetic resin that is in a belt shape. As shown in FIG. 6, the film material is folded in half to make both ends 53A and 53B overlap each other, and the both overlapping ends 53A and 53B are inserted into the gap that is formed between the notch portions 55A and the second upper surface cover 12. The both overlapping ends 53A and 53B of the flexible guide 53 are formed in an arrowhead shape, and the arrowhead portion is inserted into the gap formed between the notch portions 55A and the second upper surface cover 12. Since the arrowhead portion is locked and caught on the notch portions 55A, the flexible guide 53 is to be a state, in which it is attached to the second upper surface cover 12.

Further, in a state where the flexible guide 53 is attached to the second upper surface cover 12, the rotating shaft 57 of the pinch roller 44D passes through the portion where the flexible guide 53 is folded in half to form a loop. So, one end 53C of the flexible guide 53 that is folded in half is put on the rotating shaft 57, and the other end (portion where the both ends 53A and 53B, before being folded in half, overlap each other) of the flexible guide 53 is attached to the reinforcement member 55, so that the flexible guide 53 is put over the reinforcement member 55 and the rotating shaft 57.

Further, a plurality of ribs 59 are formed to be projected on the lower surface of the second surface cover 12. The ribs 59 are in an arc shape so that the front end surfaces thereof form concave surfaces (see FIG. 6), and the concave surfaces function as guide surfaces that define the outer circumference side of the inversion path 51B. The flexible guide 53 is arranged in the position between the adjacent ribs 59 and the movement thereof in the front and rear directions is restricted. Further, a projection piece 61 is provided in the position that faces the flexible guide 53, and thus the movement of the flexible guide 53 in the left and right directions is also restricted.

Figure 7:
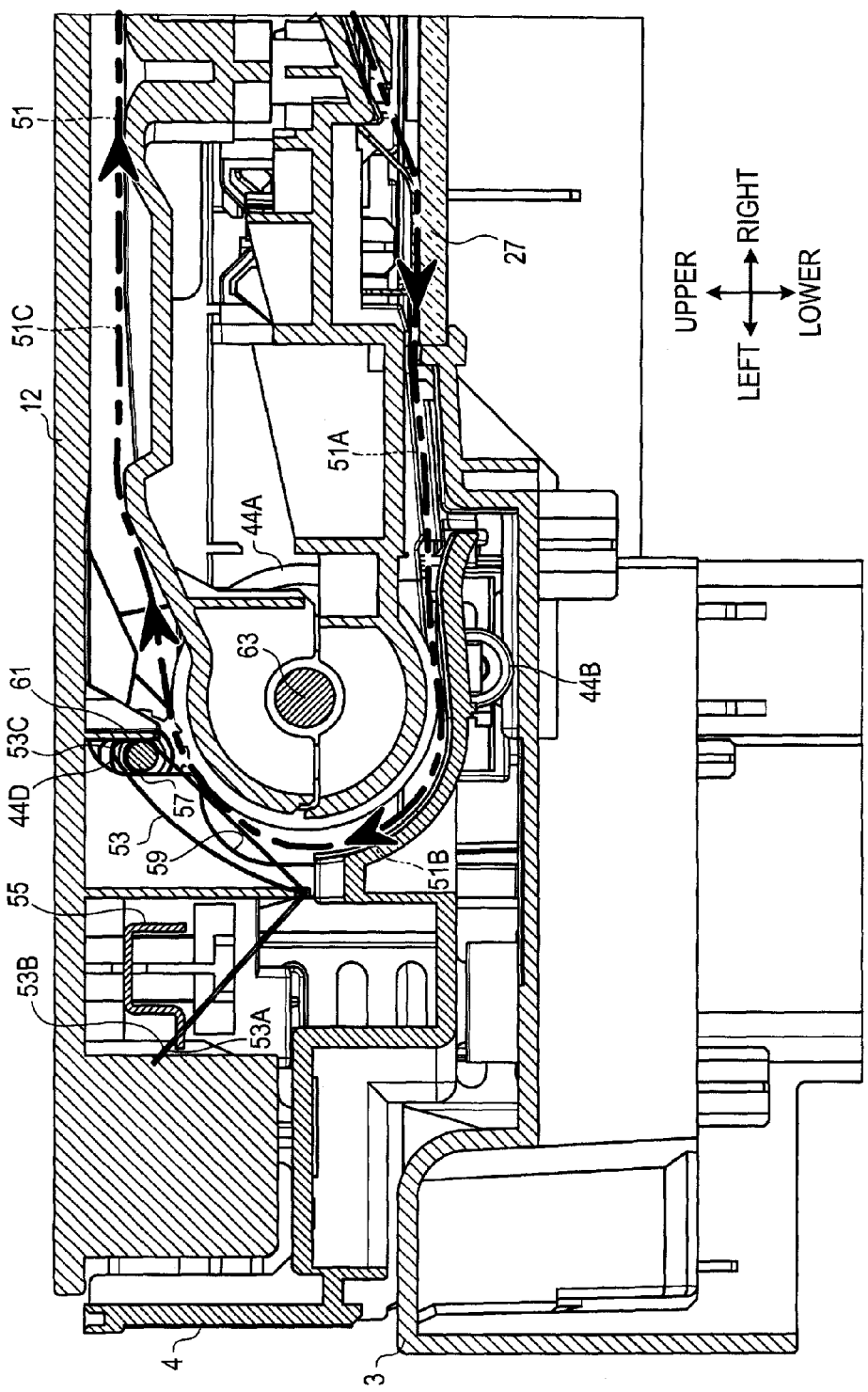
FIG. 7 is a longitudinal cross-sectional view of the vicinity of a flexible guide.

As shown in FIG. 7, the flexible guide 53 as described above is provided in the position close to the upper-side path 51C in the inversion path 51B (specifically, the upper position than the rotating center 63 of the conveyance roller 44A in the inversion path 51B.) As seen from the axis direction of the conveyance roller 44A, the flexible guide 53 is arranged in the position to cross the space provided between the outer circumferential surface of the conveyance roller 44A and the guide surface that is the front end surface of the rib 59. That is, the front end of the document that is conveyed from the lower-side path 51A comes in contact with the flexible guide 53 before it comes in contact with the rib 59.

Through this, if the document, which is conveyed from the upstream side in the conveyance direction, is conveyed upward along the inversion path 51B, the front end of the document comes in contact with the flexible guide 53. At this time, the flexible guide 53 is elastically deformed by the force that is applied from the document, and guides the front end of the document to the downstream side in the conveyance direction. As described above, if the flexible guide 53 is elastically deformed, the portion, which becomes the guide surface of the document in the flexible guide 53, retreats to the outer circumference side of the inversion path 51B.

Accordingly, unlike the case where the front end of the document comes in direct contact with the rib 59 that is fixed to the fixed position, the document can be suppressed from slowing instantaneously when the front end of the document that is conveyed upward is bumped with the flexible guide 53. That is, the contact portion of the flexible guide 53 with the document functions as the guide surface which can deformed appropriately due to the pressing of the document when the front end of the conveyed document comes in contact with the flexible guide 53. As a result, the conveyance speed of the document, which is conveyed upward in the inversion path 51B, can be stabilized without instantaneously slowing the conveyance speed when the document comes in contact with the flexible guide 53, and thus the document can be conveyed to the downstream side in the conveyance direction more smoothly. Further, since the conveyance speed of the document is stabilized, the quality of the image that is read by the image sensor 21 can be improved.

In this embodiment, since three conveyance rollers 44A and two flexible guides 53 are arranged in the positions that slip off in the front and rear directions and do not interfere with each other, the flexible guides 53 do not obstruct the movement of the conveyance rollers 44A.

Further, in this embodiment, since the flexible guide 53 is attached by using the rotating shaft 57 of the pinch roller 44D, the flexible guide can be attached to the rotating shaft 57 as the attachment point of the flexible guide 53 for two proposes, even if a dedicated member is not provided in the position that is in the vicinity of the rotating shaft 57.

Further, in this embodiment, since the flexible guide 53 comes in contact with the document at the point that is in a state where it is folded in half and becomes twofold, it is possible to make the portion having appropriately tensility and elasticity come in contact with the front end of the sheet, as compared with the case where the flexible guide comes in contact with the document at the one-fold film material. Accordingly, even if the front end of the document, which has a certain tensility, comes in contact with the portion, the document can be smoothly guided toward the downstream side in the conveyance direction. Specifically, in the above embodiment, the flexible guide has a gap provided between the film materials that are folded in half and are in a twofold state. Accordingly, unlike the case where such a gap is not formed, the front end of the sheet can lightly come in contact with the first sheet of film to smoothly receive impact. On the other hand, if the front end of the sheet strongly comes in contact with the first sheet of film, the second sheet of film receives load and catches the sheet in a state having more tensility, and thus the film can appropriately receives the impact due to the contacting state of the document.

Further, in this embodiment, since the end portion of the flexible guide 53 that is opposite to the folded portion (the portion where both ends of the belt-shaped film material overlap each other) is attached to the second upper surface cover 12, the positional mismatch of the flexible guide is suppressed.

Other Embodiments

Although an embodiment of this disclosure has been described, this disclosure is not limited to such a detailed embodiment as described above, but other various embodiments can be realized.

In the above-described embodiment, it is exemplified that the automatic document conveyance device that is provided in the image reader is configured as an example of the sheet conveyer. However, this disclosure is useful in the case where a conveyance mechanism of recorded medium that is provided in the image forming device is configured as the sheet conveyer.

Further, in this embodiment, it is exemplified that the multifunction peripheral 1 having other functions (e.g., print function, copy function, facsimile transmission/reception function, and the like) in addition to the function (scan function) of the image reader is provided. However, other functions provided in the multifunctional peripheral are optional, and this disclosure can be applied to an image scanner device having only a single function as an image reader.

Further, the number of conveyance rollers 44A and the number of flexible guides 53 are not limited to those described in this embodiment, but can be changed depending on the size of the device. Further, the flexible guide 53 is not limited to the construction that is folded in half, and as seen from the axis direction of the conveyance roller 44A, it is preferable that one sheet of film is arranged in the position to cross the space provided between the outer circumferential surface of the conveyance roller 44A and the guide surface that is the front end surface of the rib 59.

Further, the attachment structure of the flexible guide 53 is not limited to this embodiment. The flexible guide 53 may be configured as a film material as in the above-described embodiment, or may be configured as a material except for the film material. That is, the flexible guide 53 is not limited to the film, and any member, which is provided in the same position as the flexible guide 53 according to the above-described embodiment to guide the front end of the document to the downstream side in the conveyance direction with being elastically deformed according to the force applied from the document or seceding from the initial position when the front end of the sheet that is conveyed from the lower side comes in contact with the member, can be used as the flexible guide.

What is claimed is:
1. A sheet conveyer comprising:
a conveyance unit configured to convey a sheet along a conveyance path comprising a lower path, an upper path positioned on an upper side of the lower path, and an inversion path, which is configured to convey the sheet from a lower side to an upper side and is defined by an inner circumference side and an outer circumference side; and
a guide provided on a downstream side in a conveyance direction of the inversion path and in a position close to the upper path in the inversion path, the guide provided between the inner circumference side and the outer circumference side so that the guide is to be displaced toward the outer circumference side by contacting with a front end of the sheet that is conveyed from an upstream side in the conveyance direction.

2. The sheet conveyer according to claim 1,
wherein the conveyance unit comprises: conveyance rollers that define the inner circumference side of the inversion path; and a guide surface that defines the outer circumference side of the inversion path,
wherein a plurality of the conveyance rollers are arranged at an interval in a direction, in which a rotating shaft of the conveyance rollers extends, and
wherein the guide is arranged in a position between adjacent conveyance rollers.

3. The sheet conveyer according to claim 2,
wherein the guide is arranged to cross a space provided between an outer circumferential surface of the conveyance rollers and the guide surface as seen from an axis direction of the conveyance rollers.

4. The sheet conveyer according to claim 2,
wherein the conveyance unit comprises a pinch roller, which is arranged at a position to come in contact with an outer circumferential surface of the conveyance rollers, configured to hold the sheet in cooperation with the conveyance rollers and to rotate while being driven by the conveyance rollers or the sheet, and
one end of the guide is attached to a rotating shaft of the pinch roller.

5. The sheet conveyer according to claim 4,
wherein the guide is attached to the rotating shaft in a state where a single film material is folded in half and the folded portion is wound around the rotating shaft of the pinch roller so that the film material becomes twofold,
wherein one side of the twofold film material comes in contact with the front end of the sheet.

6. The sheet conveyer according to claim 5,
wherein the guide has a gap between the film materials which are twofold.

7. The sheet conveyer according to claim 5,
wherein an end portion of the guide, which is on the opposite side to the folded portion, is attached to a cover member that covers the conveyance unit.

8. The sheet conveyer according to claim 7,
wherein a sheet-metal member that reinforces the cover member is provided on an inner surface of the cover member that covers the conveyance unit, and
wherein the end portion of the guide, which is on the opposite side to the folded portion, is inserted into a supporting portion that is formed on the sheet-metal member, so that the guide is attached to the cover member side.

9. The sheet conveyer according to claim 7,
wherein a plurality of ribs, which extends toward the conveyance unit, are provided on an inner surface of the cover member to cover the conveyance unit,
wherein front ends of the plurality of ribs form the guide surface, and
wherein the film material is arranged between adjacent ribs.

10. An image reader comprising:
a conveyance unit configured to convey a sheet along a conveyance path comprising a lower path, an upper path positioned on an upper side of the lower path, and an inversion path, which is configured to convey the sheet from a lower side to an upper side and is defined by an inner circumference side and an outer circumference side;
a reading unit configured to read an image of the sheet that is conveyed by the conveyance unit; and
a guide provided in a downstream side in a conveyance direction of the inversion path and in a position close to the upper path in the inversion path, the guide provided between the inner circumference side and the outer circumference side so that the guide is to be displaced toward the outer circumference side by contacting with a front end of the sheet that is conveyed from an upstream side in the conveyance direction.

11. A sheet conveyer comprising:
a conveyance unit configured to convey a sheet along a conveyance path, which comprises a lower path, an upper path positioned on an upper side of the lower path, and an inversion path connecting the lower path and the upper path to each other to convey the sheet from a lower side to an upper side, from the lower path to the upper path; and
a guide provided in a position close to the upper path in the inversion path to guide a front end of the sheet to a downstream side in a conveyance direction while being elastically deformed according to a force applied from the sheet when the front end of the sheet, which is conveyed from an upstream side in the conveyance direction, comes in contact with the guide.

* * * * *